3,737,374
TREATMENT OF PULP MILL WASTES
Arthur M. Stern, Highland Park, N.J., and Lawrence L. Gasner, Cornwells Heights, Pa., assignors of a fractional part interest to Betz Laboratories, Inc., Trevose, Pa.
No Drawing. Filed July 22, 1971, Ser. No. 165,351
Int. Cl. C12b 1/00
U.S. Cl. 195—9     7 Claims

ABSTRACT OF THE DISCLOSURE

The present disclosure is directed to a method with a two-fold objective. As is well known, pulp mill wastes which are primarily composed of lignin are dark in color and extremely resistant to biodegradation. Accordingly, the discharge of these wastes to any natural waterways is limited by legislation. The present invention provides a method for improving the color characteristics of the waste and for utilizing the product or material obtained thereby to produce valuable and utilizable materials or chemicals. Basically, the method entails contacting an oxidatively treated waste and, more specifically, an oxidatively treated waste lignin with a microbial population for a time and at conditions necessary to convert said oxidatively treated lignin to the utilizable end products. Examples of utilizable products which can be obtained in this manner are organic acids, biopolymers, proteins, antibiotics, steroids, vitamins, fertilizers, etc.

BACKGROUND OF THE INVENTION

Kraft pulping, also referred to as sulfate pulping, and sulfite pulping, although somewhat different in process, possess what may be called a common problem-causing disadvantage. As is well known, both pulping processes give rise to waste by-products which must be dealt with effectively. Current legislation on the municipal, state and federal levels has prohibited or at least qualified the type effluent which may be discharged to natural waterways. Since this is the case, the paper industry is faced with the problem of providing for the effective and legal discharge of these waste products. This problem is complex technically bacause these wastes are extremely resistant to biodegradation and thus are not amenable to conventional biological treatment methods. In addition, they are highly colored so adsorption or precipitation techniques of removal must be designed to be exceptionally efficient to accomplish adequate treatment. High treatment levels and correspondingly high losses during adsorbent or precipitant recovery contribute to the high cost of these methods. As is apparent, if there is a cost incurred in providing for the disposal of wastes from the pulping process, then the cost of the pulp derived must necessarily reflect this cost. As can be appreciated from the knowledge of the amount of pulp produced, the amount of waste lignin produced is extremely large. For example, in 1967 the average Kraft mill output was 400 tons of paper per day with the concomitant generation of 192 tons of waste lignin per day. It is presently estimated that by 1977 these figures will be double. Nationally, this would mean that in 1977 there would be an estimated production level of over $29 \times 10^6$ tons of paper with a corresponding discharge of $14 \times 10^6$ tons of waste lignin into various bodies of water serving as waste diluents. To merely treat that volume of waste water with any chemical prior to its disposal obviously would require a huge expenditure.

The major problem in these effluents or wastes from the pulp mill is their high content of lignin, a natural wood polymer that is extremely resistant to biodegradation and which imparts a black color to any diluent to which it is added. "Lignin" is the major non-carbohydrate constituent of wood and woody plants and it comprises between 18% and 38% of the mass of such vegetation. Lignin functions as a natural plastic binder for the cellulose fibers and is stated to be, composition-wise, a polymeric substance of substituted aromatics. Since in the pulp and paper industry lignin-containing materials such as wood, straw, cornstalks and other vegetable and plant tissues are processed to recover the cellulose or pulp, the plastic binder or, more specifically, the lignin is obtained as a by-product. Since the quantity of lignin obtained in the production of pulp is extremely large, considerable effort has been expended to find ways to utilize the chemical values of this material. However, only limited markets have been found where lignin or lignin-developed derivatives can be utilized. While there is some variation in the chemical structure of lignin products from different origins (because of differences between species of woods used in the pulping process, differences in the processes themselves, and differences in the techniques used to recover lignin), the basic structure and properties of all lignins for the specific purpose of this invention may be considered to be similar. The molecular weight of lignin and its derivatives, since they are polymeric in nature, vary somewhat depending upon the method employed for their determination. In accordance with the present invention, the molecular weights were ascertained by gel permeation chromatography using a 3% Kraft lignin solution. The elution curves, measured by differential refractometry, established that the molecular weight range of the component lignins was between 50,000 and 100,000 when calibrated by known molecular weight fractions of dextran.

Since the lignin and its derivatives are tho most predominant in contributing to the color of the wastes or the discharge from a pulping process, considerable effort and money has been expended by the pulping industry to develop various processes for either or both the removal and/or conversion of lignins so as to produce a more acceptably colored discharge or waste. Many processes have been proffered but few have met with success. For example, it is well known that the addition of lime to the pulping effluent will result in the precipitation of colored bodies. The precipitate obtained, however, is gelatinous in nature, low in solids, difficult to separate and extremely resistant to dewatering by accepted methods and presents a disposal problem of its own. A dewaterable sludge may be obtained by the addition of large amounts of lime, however, much of the lime is lost, adding greatly to the economics of the process itself. Activated carbon, which removes colored materials by adsorption, possesses the same disadvantages. Some attempts have been made to combine the massive lime and activated carbon techniques but the limitations cited above still prevail and costs remain high. None of these treatments incorporates any concept of obtaining utilizable products whose value could offset the high costs of treatment or provide for a return on invested capital.

Summarizing the above, it may be stated that conventional secondary treatments failed to reduce this problem since the lignin constituents of these wastes are not biodegradable and effluents are still unacceptably colored. Thus far, only three functional methods have been proposed for removing color from pulp and paper mill effluents. These involve the application of massive lime, activated carbon or a combination of both. All possess the disadvantages of (1) high cost, (2) continuous need for solids disposal and/or regeneration of reactant, and (3) no provision for return on invested funds.

Upon undertaking the task of developing a suitable process for the treatment of pulping discharges, the present inventors were aware that the process must in fact be simple, expedient and economical. If in fact the process were not economical, then there had to be an imaginative ramification to hopefully allow the process to be at least self-supporting economically. Of course, the most desirable outcome would be to provide a process where the waste effluents could be decolorized to an acceptable degree and, in turn, to use the decolorized product to produce valuable and utilizable materials. The latter is in fact what the present inventors have accomplished.

GENERAL DESCRIPTION OF THE INVENTION

Generally, the proposed approach involves the initial decolorization and partial depolymerization of lignin by the application of a strong oxidizing agent to representative paper mill lignin-containing effluent systems. As earlier explained, the lignin is highly resistant to biodegradation which means that it does not function or serve to any great degree as a nutrient for microbes. It was felt that if the lignin could be treated in such a manner as to convert the lignin into smaller carbonaceous molecules, these smaller molecules when complemented with a mineral salts-yeast extract supplement would serve as a nutrient and the ultimate goal would be the production of valuable and utilizable end products or chemicals such as organic acids, biopolymers, proteins, antibiotics, steroids, vitamins, fertilizers, etc.

The mode utilized was one which provided for the cleavage of the linkages of large polymeric molecules to produce the smaller, microbial-growth supporting molecules. In subjecting the lignin waste to vigorous oxidation, it was ascertained that not only were the smaller molecules obtained, but also the unacceptable color of the waste was reduced to a degree that the waste could be, from a color standpoint, discharged to streams, rivers, etc. to which it could not previously have been added.

Generally, the system requires (1) chemical transformation of lignin to non-chromophoric carbonaceous materials followed by (2) the biological conversion of the resultant mixture to products of commercial interest and value. Either highly concentrated individual waste streams, such as pine and harwood black liquors, streams from various bleaching stages, etc. or the more diluted combined effluent from pulp and paper mills may be vigorously oxidized. The oxidation treatment is believed to reduce unsaturated bonds in the lignin molecule and open or cleave ring structures ultimately destroying the lignin molecule and consequently the dark color of the starting material. The oxidation step referred to earlier is not to be confused with the oxidation step which might occur during the pulping or bleaching (i.e. the hypochlorite, chlorine and chlorine dioxide treatments which are used to brighten the pulp) processes. Although the lignin wastes which are the subject of this invention are present during the bleaching stage, the oxidation taking place is not sufficiently vigorous to in fact effectively depolymerize the lignin or, more specifically, to alter the lignin structure in such a way that the resultant products will readily support microbial growth and will not possess the inherent dark or black color characteristic of lignin effluents.

Accordingly, the tight control of the oxidation treatment is a necessity since (1) under-oxidation could result in too high a concentration of biologically resistant residues which would have the two-fold disadvantage of a reduction in the amount of valuable product produced by microbial fermentation, and a resultant effluent which might still be of objectionable darkness and, accordingly, could not be discharged as desired; and (2) over-exposure could result in the loss of carbon which is potentially useful as a microbial nutrient. The optimum degree of oxidation is that level of treatment which converts dark lignin effluents to products whose color would make them acceptable for direct discharge into rivers and streams and whose degree of depolymerization and/or dissolution would allow their maximum utilization as microbial nutrients.

Another method of determining when oxidation has been carried out to a degree where the most effective nutrient substrate is obtained is to measure the molecular weight of the mixture or product as obtained by the oxidation. As earlier stated, the molecular weight of lignin has been measured to be within the range of 50,000 to 100,000 (method described earlier) depending upon the source of the lignin, the treatment used to separate the lignin from the cellulose from the plant or tree fibers, etc. It has been found to date that the oxidation of lignin having a molecular weight of 10,000 to 100,000 to produce carbonaceous products or materials having molecular weights ranging from 10,000 to 100 provides products which are quite effective as nutrient substrates. Because of the nature of the starting material, i.e. the lignin, the results of the oxidation will, in most instances, provide a mixture of resultant product. The molecular weight of each of the respective products which constitutes a mixture might be different but all, for the most part, will fall within the range of 10,000 to 100. The objective, of course, is to obtain a mixture where all the separate components possess a molecular weight of less than 10,000 in order to obtain the most effective substrates.

The term "oxidized lignin" or "oxidatively treated lignin," as herein used in reference to treated lignin, means subjecting the lignin product or the lignin waste to oxidation to the extent that the original lignin molecules have been depolymerized or the linkages thereof have been opened to the extent that lower molecular weight molecules have been obtained. It is also a part of the definition that the oxidation of the lignin has occurred to the extent that the resutling product is such that it is an effective microbial carbon nutrient.

In oxidizing the lignin product of the waste lignins, the various known methods of oxidation may be used provided the method is of sufficient strength over a given period of time to produce the carbonaceous oxidation products which will support microbial growth in accordance with the present invention. In order for the oxidation to be practical, the oxidation method and oxidizing agent should be sufficiently strong to provide the degree of oxidation required within reasonably short contact times. The oxidation may be carried out under various conditions including acidic, neutral or alkaline conditions. Since lignin wastes derived from a Kraft pulping process are generally alkaline in nature, it is accordingly more practical and prefered to carry out the reaction in the alkaline state. The oxidizing agents which may be used in accordance with the invention include the well-known agents, of which may be mentioned, oxygen; air; ozone; peroxide; permanganate; chromates; metal oxides, such as the oxides of copper, silver, and cobalt; mineral acids, such as nitric acid; and organic oxidizing agents, such as peracetic acid. Although many oxidizing agents can be used successfully, those recommended from the standpoint of practicality and time limitations include ozone, peroxide and permanganate. The oxidation stages may be carried out using the above recommended agents at relatively low temperatures while temperatures up to 210° C. have been effective. However, in view of the large volumes contemplated for treatment, room temperature or low temperatures offer the greatest practicality.

As a result of the oxidation process, it is interesting to note that not only is the initially black aqueous lignin waste solution reduced or changed to a pale straw-yellow color which would be acceptable as a final discharge effluent, but also the initially high pH values (in the range of 9 to 11) were reduced to a pH of 7 or lower. The reduction in pH offers two distinct advantages in that the effluent can be either discharged safely to a receiving stream or subjected directly to biodegradation without prior neutralization.

SPECIFIC EMBODIMENTS

In order to illustrate the effectiveness of the various steps of the invention, i.e. the correlation between color and molecular weight of the product or material obtained by the oxidation of the lignin and the product's usefulness as a nutrient substrate, various individual experiments were conducted to establish the various parameters.

DECOLORIZATION

Two hundred and fifty milliliters of a caustic extract waste effluent stream (black) containing approximately 0.3% by weight of organic matter (lignin, lignin derivatives, etc.) were subjected to ozone generated from pure oxygen gas by a Welsbach Model T-816 ozonator at a pressure setting of 8 p.s.i. and an energy utilization rate of 250 watts. The rate of addition of the ozone and oxygen mixture was one (1) liter per minute. In Table I, the percentage color reduction as measured on a spectrophotometer at a wavelength of 360 nm. is set forth for the particular exposure time, i.e. the time that the waste lignin was subjected to ozone treatment:

TABLE 1

| Exposure time (minutes): | Percent color reduction |
|---|---|
| 15 | 50 |
| 30 | 68 |
| 60 | 80 |
| 120 | 89 |

The residual color was a very light yellow, an extreme change from the black color of the starting waste. The pH of the waste during ozonation dropped from 10 to 7, a value which is more suitable for biological activity. The ozonation obviously changed the color of the waste to a degree which made it acceptable for discharge to a receiving stream. The effects obtained from the above study proved to be characteristic of waste lignin ozonation since the results were demonstrated repeatedly when the process was applied to several dilutions of caustic extract, black liquor from hardwood and softwood pulping processes and a commercially available lignin.

DEPOLYMERIZATION OF LIGNIN DETERMINED BY MEANS OF MOLECULAR WEIGHT MEASUREMENT

The successive molecular weight distribution changes were measured for an aqueous solution of lignin over a three hour ozonation period. The molecular weight measurements were made by gel permeation chromatography utilizing a 3%, by weight, aqueous solution of Kraft lignin. The elution curves, measured by differential refractometry, were obtained from sample lignin solutions taken initially, after one hour, two hours and three hours respectively. The initial average molecular weight of the sample as measured by the described technique corresponded with the reported molecular weight of 50,000 to 100,000 for lignin.

The ozonation was accomplished with a one liter working volume using an ozone-oxygen flow rate of five (5) liters/minute. After three hours of ozonation, the material was divided equally on a weight percent basis between a fraction of less than 1000 molecular weight and a fraction near 10,000 molecular weight.

The measurements made after the first and second hour periods established the gradual reduction in molecular weight of the depolymerized lignin to the numerical values obtained after the third hour of ozonation. It was, of course, apparent from these studies that ozonation did in fact break linkages in the lignin polymer to effectively depolymerize high molecular weight lignins to lower molecular weight molecules.

BIODEGRADABILITY OF OZONATED WASTE LIGNIN BY MIXED SOIL INOCULA

Several soil samples were obtained from the banks of a river located downstream from the effluent outfall of a Kraft pulp and paper mill. These samplings were cultured to promote the growth of any microbes which existed in the environment. The objective was to obtain mixed microbial populations from the soils which were constantly bathed in an environment closely associated with the waste lignin systems to be treated in accordance with the present invention.

A commercially available aqueous lignin solution (3% lignin) was ozonated at one (1) volume/volume/minute for a period of 5 hours. The substrate, i.e. resultant product, was sterilized and mineral salts commonly added to carbonaceous nutrient substrates for the production of cells were sterilized separately and added to the ozonated lignin and thoroughly mixed. The salts and yeast extract added to the substrate to serve as the medium were as follows on the basis of grams per liter:

| | Grams |
|---|---|
| Ammonium sulfate | 3 |
| Dibasic potassium phosphate | 1 |
| Magnesium sulfate | 0.5 |
| Potassium sulfate | 0.5 |
| Ferrous sulfate | 0.01 |
| Yeast extract | 0.01 |

The mineral salts will not, of course, support microbial or cell growth in and of themselves but are necessary if proteinaceous materials are to be produced from the carbonaceous substrate obtained from the oxidation of the lignin.

CONVERSION STUDY

A 0.3% aqueous lignin (pine caustic extract) solution was ozonated at a rate of one (1) liter per minute. This ozone treated lignin was employed as the sole carbon source in two media containing salts required for microbial growth. One medium (pH 7) was then inoculated with a mixture of bacteria while the other (pH 5.5) was inoculated with a mixture of molds; both groups of microbes were derived by enrichment of soils. Under non-ideal conditions, the bacterial mixture produced 0.54 g./l. dry weight of proteinaceous cells and the mold mixture produced 0.58 g./l. dry weight of cells. This represents conversion efficiency of 37% and 39% respectively based on the normal expectation of 50% conversion of available carbon to cell mass. Using pure cultures, optimal environmental conditions and higher substrate concentrations, conversion efficiencies could be expected to be greater.

The objectives of these tests were two-fold. Initially, it was intended to ascertain whether mixed microbial populations which existed in a waste lignin environment and which did not significantly biodegrade the lignin would in fact utilize the ozonated lignin and convert the ozonated lignin to valuable proteinceous material. Secondly, it was desired to ascertain the conversion rates, i.e. the amount of substrate converted to proteinaceous cells.

The growth of the mixed cultures on the oxidized lignin substrates was observed over an incubation period of 1 to 4 days. Incubation temperature was approximately 28° C.

It was ascertained that the mixed microbial populations derived from the soil samples were not only capable of utilizing the ozonated lignin nutrient, but also were capable of using the nutrient in this non-idealized system at a conversion (to biomass) efficiency of 20% and 25%.

The average dry cell weight (mg./ml.) which is a direct reflection of conversion rate increased during the incubation period. For example, at 0 hour incubation, the reaction mixture (inoculated medium) having a pH of 7.0 contained an average of 0.75 mg./ml. of dry microbial cell mass while the reaction mixture having a pH of 5.5 contained 0.90 mg./ml. At the end of one day, the reaction mixture having a pH of 7.0 exhibited a growth of 4.24 mg./ml. while the reaction mixture having a pH of 5.5 exhibited a growth of 6.0 mg./ml. After 4 days, the levels of growth were 6.15 mg./ml. for the pH 7.0 reaction mixture and 6.65 mg./ml. for the pH 5.5 mixture. The study not only established that conversion progressed with incubation time, but also that an acidic pH promoted a greater conversion as compared to a neutral pH system. More importantly, it was clearly established that microbial populations which had little or no effect on lignin per se did in fact operate quite effectively in converting the "oxidized lignin."

GROWTH RESPONSES OF SOIL ISOLATES TO VARYING SUBSTRACT OZONATION EXPOSURES

Microbial isolates were obtained on appropriate nutrient agars from soil samples described in the preceding section. These isolates were referred to as Bacterial Soil Isolate #4, Mold Soil Isolate #1004 and Bacterial Soil Isolate #2.

Aqueous lignin solutions (3% lignin) were ozonated for various lengths of time extending from 0 hour up to and including 42 hours. The ozonation rate was one (1) volume/volume/minute. The products derived from the oxidation of the lignin, referred to as the substrate, were sterilized, mixed with mineral salts and yeast extract in the addition concentrations as listed in the preceding section, inoculated with the Isolates and incubated for 72 hours at room temperature.

Utilizing the cell dry weight increase measured on a grams per liter basis, it was ascertained that the Bacterial Soil Isolate #4 utilized the substrate better as ozonation progressed up to 15 hours. The same was found to be true with respect to the response of the Mold Soil Isolate #1004. With respect to the latter, however, the optimal substrate treatment appears to be at around 5 hours.

Another type behavior was exhibited by Bacterial Isolate #2. This organism showed a lower response when grown on a substrate ozonated for 5 hours than it did on substrates obtained by ozonation for longer periods.

Accordingly, although the responses varied with the different Isolates, what was important was that the products obtained from the oxidation of the lignin all were converted to the valuable proteinaceous product.

BIODEGRADABILITY OF OZONATED WASTE LIGNIN BY KNOWN MICROORGANISMS

A 1% aqueous lignin solution was ozonated for 3 hours at a rate of 5 liters/minute. Samples of oxidized products obtained were mixed with the mineral salts listed above and were inoculated with the organisms set forth below. The inoculated samples were incubated for 96 hours at a temperature of 28° C. in the mineral salts-yeast extract medium as described earlier.

EXAMPLE 1

One type product obtained which was of commercial value was that obtained by the action of Pseudomonads. Of the 15 members of this family which were used to inoculate the samples, each was capable of utilizing the oxidized product as its sole source of carbon. Growth and conversion was particularly good in the case of several strains of *Pseudomonas putida* which are well-known for their ability to attack aromatic structures.

EXAMPLE 2

Each of four samples of the oxidized product obtained and treated as described above was inoculated with one of:

*Aspergillus niger* A.T.C.C. 16888;
*Aspergillus niger* A.T.C.C. 9029;
*Penicillium chrysogenum* A.T.C.C. 10002; and
*Acetobacter suboxydans* A.T.C.C. 621

The samples were then incubated as stated above.

The resultant medium was objected to gas chromatography in order to establish the identity of the products resulting from the fermentation. One of the resulting products in each instance was fumaric acid whose identity was confirmed by comparison with known pure fumaric acid. The spent reaction mixtures from inoculated controls were then subjected to the same chromatographic process to ascertain whether the controls contained this product. This was performed in order to confirm that the fumaric acid was in fact formed. The tests on the uninoculated controls proved negative.

From the foregoing then, it is apparent that the oxidized lignin products as opposed to lignin itself do provide a very effective nutrient medium for microorganisms. Moreover, since the oxidized products are more susceptible to attack and conversion, the chemicals which can be obtained by the fermentation would include organic acids, biopolymers, antibiotics, steroids, vitamins, fertilizers, proteinaceous materials which can be utilized as food for animal feed, etc.

The choice then arises as to which product is desired and the use of microbes which would likely produce the desired product. For example, *Aspergillus flavus* can transform carbohydrate substrates into materials or products which have found excellent utility as fertilizers. Similarly, yeast cultures such as *Torula utilis* and *Rhodotorula ruba* in a carbon base have been found to produce soil enriching agents. The degree of lignin oxidation and the proper incubation periods can easily be ascertained utilizing the teachings of the present invention.

Although the foregoing has been rather specific relative to the embodiments of the invention, it should be pointed out that the invention has broad overtones. For example, it has earlier been described that the molecular weight of waste lignin changes with the degree of oxidation. While this is certainly true and equally true is the fact that at present the preferred range of molecular weight for the oxidized product lies in the range of from about 10,000 to 100, this is not to be construed as negating the use of higher or lower molecular weights of oxidation products since they may be utilized quite effectively with the determinations of the most effective microorganisms and the fermentation conditions.

Commensurate with this rationale, of course, is the fact that although the section dealing with molecular weight reduction sets forth specific oxidation conditions, there is no reason why different conditions could not be devised to obtain the same results, i.e. slower oxidating agent feed, longer oxidation periods, different temperatures, etc. The important feature of the invention is not the oxidation timetable per se but what is accomplished by the oxidation, i.e. the cleavage or opening of the bonds of the polymeric structures of the lignin to produce smaller growth-supporting molecules. The above is equally true with respect to incubation temperatures which may range anywhere from 4° C. to 70° C. and incubation duration, i.e. several minutes to several weeks. These conditions for the most part are practical and economical considerations.

The foregoing has been generally directed to the basic goal of producing valuable and utilizable materials, products and/or chemicals from a waste material, i.e. lignin, lignosulfonates and other lignin derivatives, which may be present in wastes. It is clear that if a uniform, controllable lignin substrate is desired, commercial purified lignins may also be oxidized to produce the uniform substrates.

The concept of the present invention obviously possesses many possible modifications and equivalent substitutions and accordingly these will be apparent to the worker in the art.

Of course, it is inherent in the process that once the substrate has been used for the fermentation production of useful compounds or materials, the waste substrate or the waste from the substrate would still be chromophorically acceptable and accordingly dischargeable to receiving water bodies.

Having thus described the invention, what we claim is:
1. A method for increasing the clarity of aqueous dispersions of lignin and obtaining utilizable fermentation products therefrom which comprises
   (i) oxidatively treating the lignin to a degree that its polymeric structure is depolymerized to produce nutrient carbon substrates containing low molecular weight structures; and

(ii) treating said nutrient medium with a microbial population for a time and at conditions necessary to produce, by fermentation, said utilizable products, where said microbial population consists of microorganisms normally associated with soils and water or derived therefrom.

2. A method according to claim 1 wherein the lignin is oxidatively treated with ozone.

3. A method according to claim 1 wherein the utilizable product is separated from any remaining medium.

4. A method according to claim 1 wherein the lignin is oxidatively treated with ozone to a degree that the resulting nutrient carbons substrates are composed of components having molecular weights ranging from 100 to 10,000.

5. A method according to claim 4 wherein the microbial population is selected from the group consisting of Pseudomonads, *Aspergillus niger* A.T.C.C. 16888; *Aspergillus niger* A.T.C.C. 9029; *Penicillium chrysogenum* A.T.C.C. 10002; and *Acetobacter suboxydans* A.T.C.C. 621.

6. A method according to claim 5 wherein the product produced is fumaric acid.

7. A method according to claim 1 wherein the lignin is a waste lignin or derivative thereof from a pulp mill.

References Cited

UNITED STATES PATENTS

| | | | |
|---|---|---|---|
| 2,415,777 | 2/1947 | Weizmann | 195—39 X |
| 2,897,148 | 7/1959 | Laboureur | 195—31 R X |
| 3,030,276 | 4/1962 | Thomsen | 195—36 R |
| 2,158,954 | 5/1939 | Zigerli | 195—2 X |

OTHER REFERENCES

Debiard et al.: Chem. Abs., vol. 73, #16528W, 1970.

A. LOUIS MONACELL, Primary Examiner

G. M. NATH, Assistant Examiner

U.S. Cl. X.R.

71—25; 195—33; 210—11